(12) United States Patent
Ogihara et al.

(10) Patent No.: US 10,343,595 B2
(45) Date of Patent: Jul. 9, 2019

(54) CONTROL SYSTEM FOR WORK MACHINE, WORK MACHINE, MANAGEMENT SYSTEM FOR WORK MACHINE, AND MANAGEMENT METHOD FOR WORK MACHINE

(71) Applicant: Komatsu Ltd., Tokyo (JP)

(72) Inventors: Masanori Ogihara, Hiratsuka (JP); Akiharu Nishijima, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 72 days.

(21) Appl. No.: 15/122,699

(22) PCT Filed: Dec. 18, 2015

(86) PCT No.: PCT/JP2015/085544
§ 371 (c)(1),
(2) Date: Aug. 31, 2016

(87) PCT Pub. No.: WO2016/093372
PCT Pub. Date: Jun. 16, 2016

(65) Prior Publication Data
US 2017/0174123 A1 Jun. 22, 2017

(51) Int. Cl.
*B60Q 1/34* (2006.01)
*G05D 1/02* (2006.01)
*B60P 1/04* (2006.01)

(52) U.S. Cl.
CPC ........... *B60Q 1/346* (2013.01); *G05D 1/0217* (2013.01); *B60P 1/04* (2013.01); *B60Q 2400/00* (2013.01);
(Continued)

(58) Field of Classification Search
CPC ....... B60Q 1/346; B60Q 2400/00; B60P 1/04; G05D 1/021; B60W 40/072; B60W 2550/146
See application file for complete search history.

(56) References Cited

U.S. PATENT DOCUMENTS 5,548,516 A * 8/1996 Gudat ................. G01S 19/11
701/23
6,125,324 A * 9/2000 Matsuda ............ B60K 31/0083
701/300
(Continued)

FOREIGN PATENT DOCUMENTS

CN 101713999 A 5/2010
JP 35-324058 A 12/1993
(Continued)

OTHER PUBLICATIONS

International Search Report dated Mar. 22, 2016, issued for PCT/JP2015/085544.

*Primary Examiner* — Jerrah Edwards
(74) *Attorney, Agent, or Firm* — Locke Lord LLP (57) ABSTRACT

A control system for a work machine includes: a turn determination unit configured to determine whether the work machine makes a turn with a predetermined curvature radius or less over a predetermined distance or more, based on running condition data including at least position data and target azimuth data for performing running control of the work machine; and a winkers control unit configured to output a winker control signal based on a determination result of the turn determination unit.

11 Claims, 7 Drawing Sheets

(52) U.S. Cl.
CPC ......... *B60Q 2900/30* (2013.01); *G05D 1/021* (2013.01); *G05D 2201/021* (2013.01)

(56) References Cited

U.S. PATENT DOCUMENTS

| | | | |
|---|---|---|---|
| 6,246,932 B1 | 6/2001 | Kageyama et al. | |
| 7,610,138 B2* | 10/2009 | Takagi | G01C 21/3407 701/117 |
| 8,577,554 B2* | 11/2013 | Wolterman | B60Q 1/34 701/36 |
| 9,302,678 B2* | 4/2016 | Murphy | B60W 50/14 |
| 2006/0173611 A1* | 8/2006 | Takagi | G01C 21/3407 701/538 |
| 2008/0162027 A1* | 7/2008 | Murphy | B60W 50/14 701/117 |
| 2012/0089300 A1* | 4/2012 | Wolterman | B60Q 1/34 701/36 |

FOREIGN PATENT DOCUMENTS

| | | |
|---|---|---|
| JP | 3424834 B2 | 7/2003 |
| JP | 2010-202021 A | 9/2010 |
| JP | 4947443 B2 | 6/2012 |
| WO | 38/37468 A1 | 8/1998 |

\* cited by examiner

CONTROL SYSTEM FOR WORK MACHINE, WORK MACHINE, MANAGEMENT SYSTEM FOR WORK MACHINE, AND MANAGEMENT METHOD FOR WORK MACHINE

FIELD

The present invention relates to a control system for a work machine, a work machine, a management system for a work machine, and a management method for a work machine.

BACKGROUND

In a mine, both of a work machine running without any person on board and a manned vehicle may operate in the same mine in some cases. For example, if a driver driving a manned vehicle can find the running direction of a work machine running without any person on board at an intersection, the safety of the mine can be improved. Patent Literature 1 discloses a technique of a direction instruction method in an automated guided vehicle of an autonomous driving method.

CITATION LIST

Patent Literature

Patent Literature 1: Japanese Patent Application Laid-open No. 5-324058

SUMMARY

Technical Problem

The use of a direction indicator is considered to contribute to the improvement of the safety of the mine. However, a technique for using a direction indicator on a work machine running without any person on board has not yet been established.

It is an objective of an aspect of the present invention to provide a control system for a work machine, a work machine, a management system for a work machine, and a management method for a work machine capable of improving the safety of the mine.

Solution to Problem

According to a first aspect of the present invention, a control system for a work machine comprises: a turn determination unit configured to determine whether the work machine makes a turn with a predetermined curvature radius or less over a predetermined distance or more, based on running condition data including at least position data and target azimuth data for performing running control of the work machine; and a winkers control unit configured to output a winker control signal based on a determination result of the turn determination unit.

According to a second aspect of the present invention, a work machine comprises the control system for the work machine according to the first aspect.

According to a third aspect of the present invention, a management system for a work machine comprises a management apparatus configured to output the running condition data to the work machine according to the second aspect.

According to a fourth aspect of the present invention, a management method for a work machine comprises: determining whether the work machine makes a turn with a predetermined curvature radius or less over a predetermined distance or more, based on running condition data including at least position data and target azimuth data for performing running control of the work machine; and outputting a winker control signal based on a result of the determination.

According to a fifth aspect of the present invention, a control system for a work machine comprises: a turn determination unit configured to determine whether the work machine makes a turn, based on running condition data including at least position data and target azimuth data for performing running control of the work machine; and a winkers control unit configured to output a winker control signal for illuminating based on a determination result of the turn determination unit, wherein the running condition data includes an aggregate of a plurality of course points which are set at predetermined intervals, each a predetermined number of course points which are arranged continuously at predetermined intervals at a forward side in a running direction of the work machine is set as a standard course point, and the turn determination unit calculates an azimuth difference indicating a difference in target azimuth between the standard course point and a reference course point at the forward side in the running direction by a predetermined distance with respect to the standard course point, calculates the azimuth difference for each of the plurality of standard course points, and when it is determined that standard course points each of whose azimuth differences is equal to or more than an angle threshold value exist continuously for a count threshold value or more, the turn determination unit determines that the work machine is making a turn.

Advantageous Effects of Invention

According to an aspect of the present invention, a control system for a work machine, a work machine, a management system for a work machine, and a management method for a work machine capable of improving the safety of the mine are provided.

DESCRIPTION OF EMBODIMENTS

Hereinafter, an embodiment of the present invention will be explained with reference to drawings, but the present invention is not limited thereto.

<Overview of Management System for Work Machine>

Figure 1:
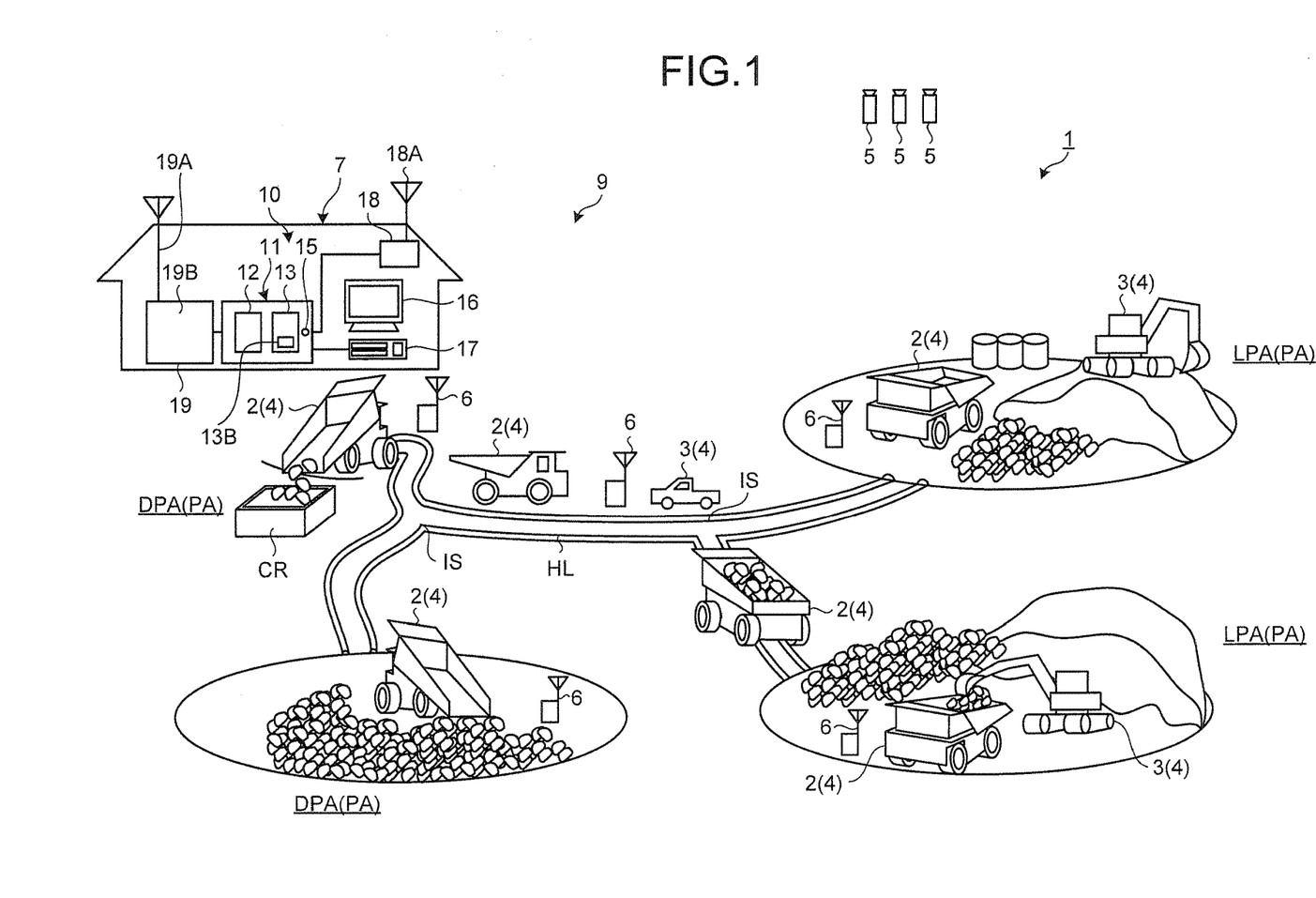
FIG. 1 is a figure schematically illustrating an example of a management system for a work machine according to the present embodiment.

FIG. 1 is a figure illustrating an example of a management system 1 of a work machine 4 according to the present embodiment. In the present embodiment, an example where the work machine 4 is a mine machine 4 operating in a mine will be explained. The management system 1 manages the mine machine 4. The management of the mine machine 4 includes at least one of an operation management of the mine machine 4, an evaluation of productivity of the mine machine 4, an evaluation of a manipulation technique of an operator of the mine machine 4, a maintenance of the mine machine 4, and an abnormality diagnosis of the mine machine 4.

The mine machine 4 is a collective term meaning machines and the like used for various kinds of works in the mine. The mine machine 4 includes at least one of a boring machine, an excavating machine, a loading machine, a carrying machine, a crushing machine, and vehicles driven by a driver. The excavating machine is a mine machine for excavating in the mine. The loading machine is a mine machine for loading a load to a carrying machine. The loading machine includes at least one of a hydraulic excavator, an electric excavator, and a wheel loader. The carrying machine is a mine machine for carrying a load. The crushing machine is a mine machine for crushing displaced earth introduced from the carrying machine. The mine machine 4 is capable of moving in the mine.

In the present embodiment, the mine machine 4 includes a dump truck 2 which is a carrying machine capable of running in the mine and another mine machine 3 different from the dump truck 2. In the present embodiment, an example where the dump truck 2 is mainly managed by the management system 1 will be explained.

As illustrated in FIG. 1, the dump truck 2 runs along at least a part of a conveyance path HL which leads to a work site PA and a work site PA in the mine. The work site PA includes at least one of a loading site LPA and an earth dumping site DPA. The conveyance path HL includes an intersection IS. The dump truck 2 runs along the conveyance path HL and a target running path which is set in the work site PA.

The loading site LPA is an area where a loading work for loading a load to the dump truck 2 is carried out. The earth dumping site DPA is an area where a dumping work for dumping a load from the dump truck 2 is carried out. In the example illustrated in FIG. 1, a crushing machine CR is provided in at least a part of the earth dumping site DPA.

The present embodiment will be explained based on the assumption that the dump truck 2 is an unmanned dump truck that autonomously drives in the mine based on a command signal given by a management apparatus 10. The autonomous driving of the dump truck 2 means running based on a command signal given by the management apparatus 10 without relying on operation of the driver.

In FIG. 1, the management system 1 includes the management apparatus 10 provided in a control facilities 7 installed in the mine and a communication system 9. The communication system 9 includes multiple relay devices 6 for relaying the data or the command signals. The communication system 9 wirelessly communicates the data or the command signal between the management apparatus 10 and the mine machine 4. The communication system 9 wirelessly communicates the data or the command signal among multiple mine machines 4.

In the present embodiment, the position of the dump truck 2 and the position of the other mine machine 3 are detected by using GNSS (Global Navigation Satellite System). The GNSS means Global Navigation Satellite System. An example of Global Navigation Satellite System includes GPS. The GNSS has multiple measurement satellites 5. The GNSS detects the position defined by coordinate data constituted by a latitude, a longitude, and an altitude. The position detected by the GNSS is an absolute position defined by the global coordinate system. The GNSS detects the position of the dump truck 2 and the position of the other mine machine 3 in the mine.

In the following explanation, the position detected by the GNSS will be referred to as a GPS position as necessary. The GPS position is an absolute position, and includes coordinate data constituted by a latitude, a longitude, and an altitude. The absolute position includes the estimated position of the dump truck 2 estimated with a high degree of accuracy.

<Management Apparatus>

Subsequently, the management apparatus 10 will be explained. The management apparatus 10 transmits the data or the command signal to the mine machine 4, and receives data from the mine machine 4. As illustrated in FIG. 1, the management apparatus 10 includes a computer 11, a display apparatus 16, an input apparatus 17, and a wireless communication apparatus 18.

The computer 11 includes a processing apparatus 12, a storage apparatus 13, and an input and output unit 15. The display apparatus 16, the input apparatus 17, and the wireless communication apparatus 18 are connected via the input and output unit 15 to the computer 11.

The processing apparatus 12 carries out computation processing for managing the mine machine 4. The storage apparatus 13 is connected to the processing apparatus 12, and stores data for managing the mine machine 4. The input apparatus 17 is an apparatus for inputting data for managing the mine machine 4 into the processing apparatus 12. The processing apparatus 12 carries out computation processing by using data stored in the storage apparatus 13, data which are input from the input apparatus 17, and data obtained via the communication system 9. The display apparatus 16 displays a computation processing result of the processing apparatus 12 and the like.

The wireless communication apparatus 18 is arranged in the control facilities 7, and has an antenna 18A, and is connected to the processing apparatus 12 via the input and output unit 15. The communication system 9 includes a wireless communication apparatus 18. The wireless communication apparatus 18 can receive data transmitted from the mine machine 4, outputs the received data to the processing apparatus 12, and stores the data to the storage apparatus 13. The wireless communication apparatus 18 can transmit data to the mine machine 4.

Figure 2:
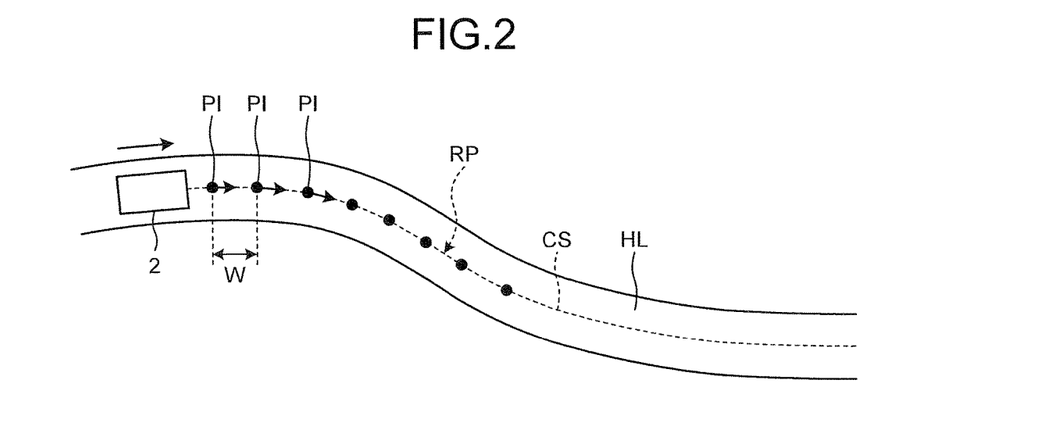
FIG. 2 is a schematic view for explaining a target running path of a dump truck according to the present embodiment.

FIG. 2 is a schematic diagram illustrating the dump truck 2 running the conveyance path HL. The processing apparatus 12 of the management apparatus 10 functions as a running condition data generation unit generating running condition data about the dump truck 2 running in the mine. The running condition data includes an aggregate of multiple course points PI which are set with a regular interval W.

Each of multiple course points PI includes absolute position data and target running speed data about the dump truck 2 at the position where the course point PI is set. The target running path RP is defined by course data CS which is an aggregate of multiple course points PI. The target running path RP of the dump truck 2 is defined by a track passing multiple course points PI. The target running speed of the dump truck 2 at the position where the course point PI is set is defined based on the target running speed data.

Each of multiple course points PI includes target azimuth data about the dump truck 2 with respect to the standard azimuth and course type data indicating which of the areas of the mine the course point PI is located at. The standard azimuth is, for example, north. The target azimuth of the dump truck 2 at the position where the course point PI is set (target running direction) is defined based on the target azimuth data. The course type data is data indicating an area of the mine where the course point PI is defined. In the present embodiment, areas of the mine where the course point PI is defined may be classified into, for example, a conveyance path HL, an intersection IS, and a work site PA. The position where the course point PI is set is determined to be the conveyance path HL, the intersection IS, or the work site PA based on the course type data.

The management apparatus 10 outputs running condition data including multiple course points PI via the communication system 9 to the dump truck 2. The dump truck 2 is controlled to run in accordance with the running condition data transmitted from the management apparatus 10, so that the dump truck 2 runs in the mine.

<Dump Truck>

Figure 3:
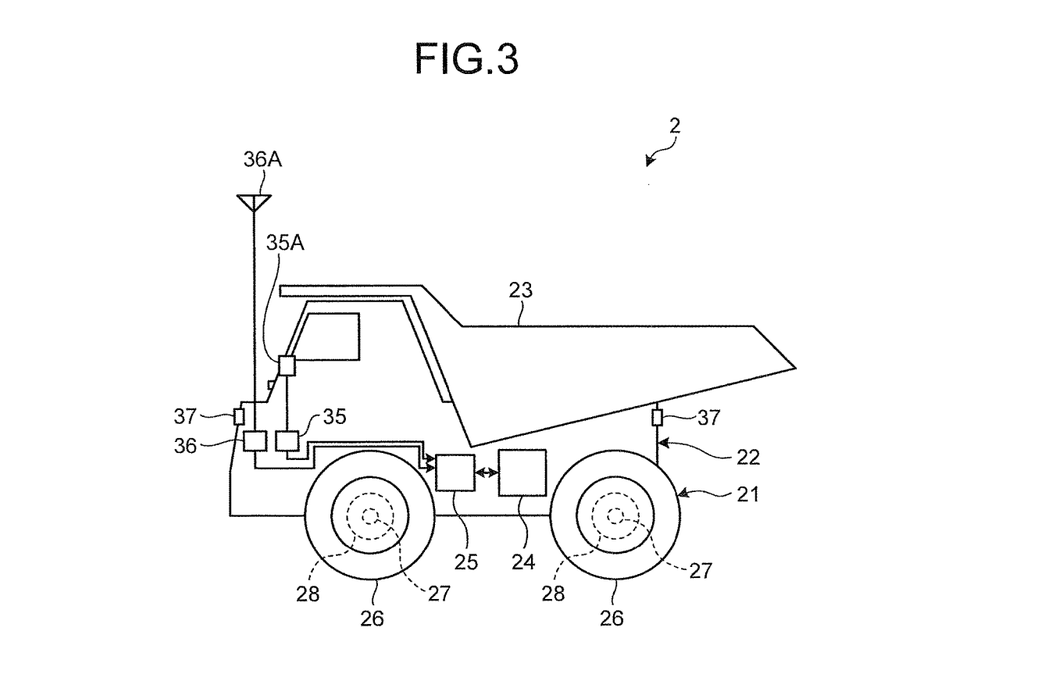
FIG. 3 is a figure schematically illustrating an example of the dump truck according to the present embodiment.
Figure 4:
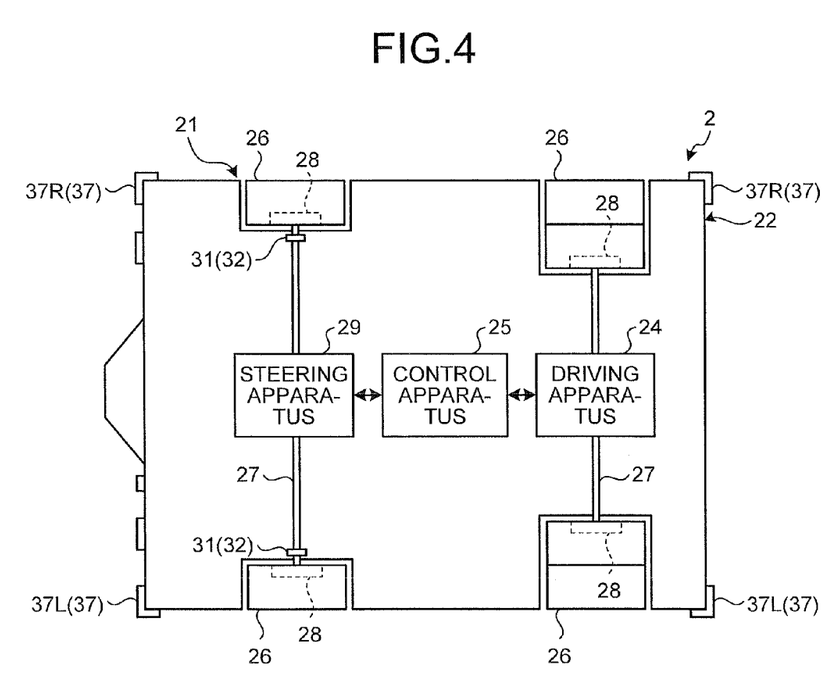
FIG. 4 is a figure schematically illustrating an example of the dump truck according to the present embodiment.

Subsequently, the dump truck 2 will be explained. FIGS. 3 and 4 are figures schematically illustrating an example of the dump truck 2 according to the present embodiment.

The dump truck 2 includes a cruising apparatus 21 capable of running in the mine, a vehicle main body 22 supported by the cruising apparatus 21, a vessel 23 supported by the vehicle main body 22, a driving apparatus 24 for driving the cruising apparatus 21, a direction indicator 37, and a control apparatus 25.

The cruising apparatus 21 includes wheels 26, an axle 27 rotatably supporting the wheels 26, brake apparatuses 28 for braking the cruising apparatus 21, and a steering apparatus 29 capable of adjusting the running direction.

The cruising apparatus 21 is activated by the driving force generated by the driving apparatus 24. The driving apparatus 24 generates driving force for accelerating the dump truck 2. The driving apparatus 24 drives the cruising apparatus 21 according to the electric driving method. The driving apparatus 24 includes an internal combustion engine such as a diesel engine, an electric power generator activated by the motive force of the internal combustion engine, and an electric motor activated by the electric power generated by the electric power generator. The driving force generated by the electric motor is transmitted to the wheels 26 of the cruising apparatus 21. Accordingly, the cruising apparatus 21 is driven. The dump truck 2 runs by itself with the driving force of the driving apparatus 24 provided on the vehicle main body 22. By adjusting the output of the driving apparatus 24, the running speed of the dump truck 2 is adjusted. It should be noted that the driving apparatus 24 may drive a cruising apparatus 5 in accordance with a machine driving method. For example, the motive force generated by the internal combustion engine may be transmitted via the power transmission device to the wheels 26 of the cruising apparatus 21.

The steering apparatus 29 can adjust the running direction of the cruising apparatus 21. The running direction of the dump truck 2 including the cruising apparatus 21 includes the direction of the front portion of the vehicle main body 22. By changing the direction of the wheels 26, the steering apparatus 29 adjusts the running direction of the dump truck 2.

The brake apparatus 28 generates braking force for decelerating or stopping the dump truck 2. The control apparatus 25 outputs an acceleration command signal for activating the driving apparatus 24, a brake command signal for activating the brake apparatus 28, and a steering command signal for activating the steering apparatus 29. The driving apparatus 24 generates driving force for accelerating the dump truck 2 based on the acceleration command signal which is output from the control apparatus 35. The brake apparatus 28 generates braking force for decelerating the dump truck 2 based on the brake command signal which is output from the control apparatus 35. The steering apparatus 29 generates force for changing the direction of the wheels 26 to straightly move the dump truck 2 or causing the dump truck 2 to make a turn based on the steering command signal which is output from the control apparatus 25.

The direction indicator 37 displays the running direction of the dump truck 2. The direction indicators 37 are provided at each of the front portion and the rear portion of the vehicle main body 22. The direction indicator 37 includes winker lamps, and by illuminating (blinking) the winker lamps, the running direction of the dump truck 2 is notified to the surrounding. The direction indicator 37 includes a winker lamp 37R which is illuminated when the dump truck 2 makes a right turn and a winker lamp 37L which is illuminated when the dump truck 2 makes a left turn. The winker lamp 37R is provided at a right portion of the vehicle main body 22, and the winker lamp 37L is provided at the left portion of the vehicle main body 22.

In the following explanation, the illumination of the winker lamp 37R will be referred to as a right turn illumination as necessary, and the illumination of the winker lamp 37L will be referred to as a left turn illumination as necessary.

The dump truck 2 includes a running speed detection device 31 for detecting the running speed of the dump truck 2, an acceleration detection device 32 for detecting the acceleration of the dump truck 2, a position detection device 35 for detecting the position of the dump truck 2, and a wireless communication apparatus 36.

The running speed detection device 31 detects the running speed of the dump truck 2. The running speed detection device 31 includes a rotation speed sensor for detecting the rotation speed of the wheel 26. The rotation speed of the wheel 26 and the running speed of the dump truck 2 are correlated, and accordingly, a rotation speed value which is a detection value of a rotation speed sensor is converted into the running speed value of the dump truck 2. Alternatively, the running speed detection device 31 may also detect the rotation speed of the axle 26.

The acceleration detection device 32 detects the acceleration of the dump truck 2. The acceleration of the dump truck 2 includes a positive acceleration and a negative acceleration (deceleration). In the present embodiment, computation processing is carried out based on the rotation speed value which is the detection value of the rotation speed sensor detecting the rotation speed of the wheel 26, so that it is converted into the acceleration value of the dump truck 2. It should be noted that the running speed detection device 31 and the acceleration detection device 32 may be separate detection devices.

The position detection device 35 includes a GPS reception device, and detects the GPS position (coordinate) of the dump truck 2. The position detection device 35 has an antenna 35A for GPS. The antenna 35A receives radio waves from GPS satellites 5. The position detection device 35 calculates the position of the antenna 35A by converting a signal based on the radio wave from the GPS satellites 5 received by the antenna 35A into an electric signal. By calculating the GPS position of the antenna 35A, the GPS position of the dump truck 2 is detected.

The communication system 9 includes the wireless communication apparatus 36 provided in the dump truck 2. The wireless communication apparatus 36 includes an antenna 36A. The wireless communication apparatus 36 can wirelessly communicate with the management apparatus 10.

The management apparatus 10 transmits a command signal including running condition data of the dump truck 2 to the control apparatus 25 via the communication system 9. The control apparatus 25 controls at least one of the driving apparatus 24, the brake apparatus 28, and the steering apparatus 29 of the dump truck 2 so that the dump truck 2 runs in accordance with the running condition data (including the absolute position data, the target running speed, and the target azimuth at multiple points PI) based on the running condition data provided from the management apparatus 10.

<Control System>

Figure 5:
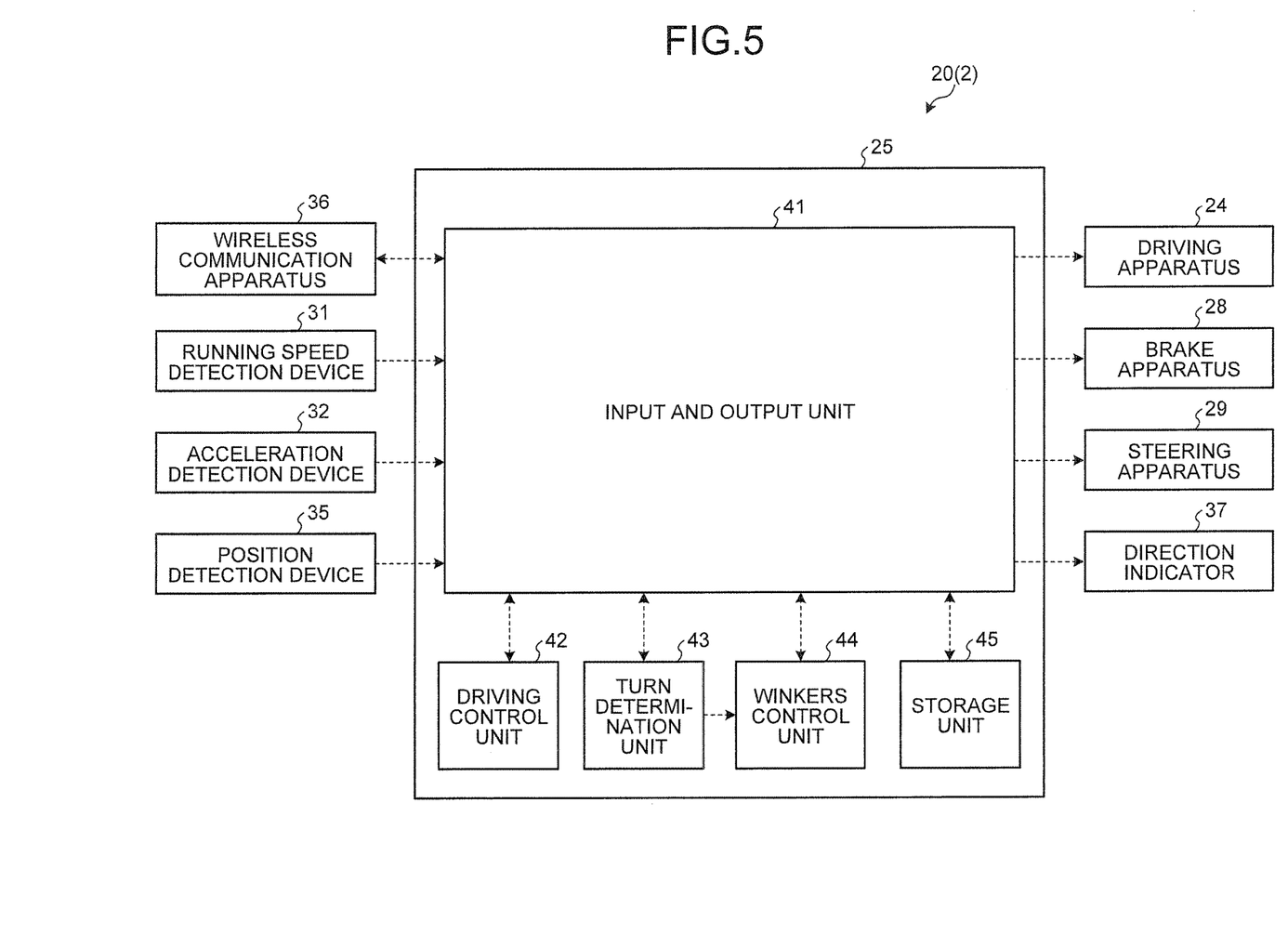
FIG. 5 is a block diagram illustrating an example of a control system of the dump truck according to the present embodiment.

Subsequently, a control system 20 of the dump truck 2 according to the present embodiment will be explained. FIG. 5 is a control block diagram illustrating the control system 20 according to the present embodiment. The control system 20 is equipped on the dump truck 2.

As illustrated in FIG. 5, the control system 20 includes a wireless communication apparatus 36, a running speed detection device 31, an acceleration detection device 32, a position detection device 35, a control apparatus 25, a driving apparatus 24, a brake apparatus 28, a steering apparatus 29, and a direction indicator 37.

The control apparatus 25 includes an input and output unit 41, a driving control unit 42, a turn determination unit 43, a winkers control unit 44, and a storage unit 45.

The input and output unit 41 obtains command data including running condition data from the management apparatus 10 which is output from the wireless communication apparatus 36, running speed data indicating the running speed of the dump truck 2 which is output from the running speed detection device 31, acceleration data indicating the acceleration of the dump truck 2 which is output from the acceleration detection device 32, and position data indicating the position of the dump truck 2 which is output from the position detection device 35. The input and output unit 41 outputs an acceleration command signal to the driving apparatus 24, outputs a brake command signal to the brake apparatus 28, and outputs a steering command signal to the steering apparatus 29.

The driving control unit 42 outputs a driving control signal controlling the cruising apparatus 21 of the dump truck 2 based on the designated running condition data. The cruising apparatus 21 includes a brake apparatus 28 and a steering apparatus 29. The driving control unit 42 outputs a driving control signal to the cruising apparatus 21 including the driving apparatus 24, the brake apparatus 28, and the steering apparatus 29. The driving control signal includes an acceleration signal which is output to the driving apparatus 24, a brake command signal which is output to the brake apparatus 28, a steering command signal which is output to the steering apparatus 29, and a winker control signal which is output to the direction indicator 37.

The turn determination unit 43 determines whether the dump truck 2 makes a turn with a predetermined curvature radius or less over a predetermined distance or more based on the designated running condition data. In other words, the turn determination unit 43 determines whether the dump truck 2 continues to makes a turn for a distance equal to or more than a distance threshold value with a degree of bent equal to or less than a curvature radius threshold value. The running condition data includes multiple course points PI arranged continuously with a regular interval W and each including target azimuth data. Accordingly, the turn determination unit 43 can determine how much distance the dump truck 2 can drive along a very tight curve based on the obtained running condition data. The specific determination method will be explained later.

Each of multiple course points PI includes course type data with which a determination can be made as to whether the course point PI is a point defined at an intersection IS of the mine or not. Therefore, the turn determination unit 43 can determine, based on the obtained running condition data, as to whether the dump truck 2 makes a right turn or a left turn at the intersection IS (the direction indicator 37 is illuminated in this case) or the dump truck 2 runs not the intersection IS but a curve of a running path HL of which bent is tight (the direction indicator 37 is not illuminated in this case).

The winkers control unit 44 outputs a winker control signal to the direction indicator 37 provided on the dump truck 2 to cause the direction indicator 37 to illuminate based on the determination result of the turn determination unit 43. The winkers control unit 44 outputs a winker control signal so that when the turn determination unit 43 determines that the dump truck 2 makes a turn at the intersection IS with a predetermined curvature radius or less over a predetermined distance or more, the direction indicator 37 is illuminated, and when the turn determination unit 43 determines that the dump truck 2 having run a predetermined distance or more and thereafter the dump truck 2 is running with a predetermined curvature radius or more at the point in time when the dump truck 2 has almost finished making the right turn or the left turn, the direction indicator 37 is turned off.

In the present embodiment, when the turn determination unit 43 determines that the dump truck 2 makes a right turn at the intersection IS, the winkers control unit 44 causes the winker lamp 37R to illuminate a right turn illumination, and when the turn determination unit 43 determines that the dump truck 2 makes a left turn at the intersection IS, the winkers control unit 44 causes the winker lamp 37L to illuminate a left turn illumination.

The storage unit 45 stores the data related to the running condition of the dump truck 2 obtained from the wireless communication apparatus 36 and the data related to the control of the direction indicator 37 explained later.

<Travelling Control and Direction Indicator Control>

Figure 6:
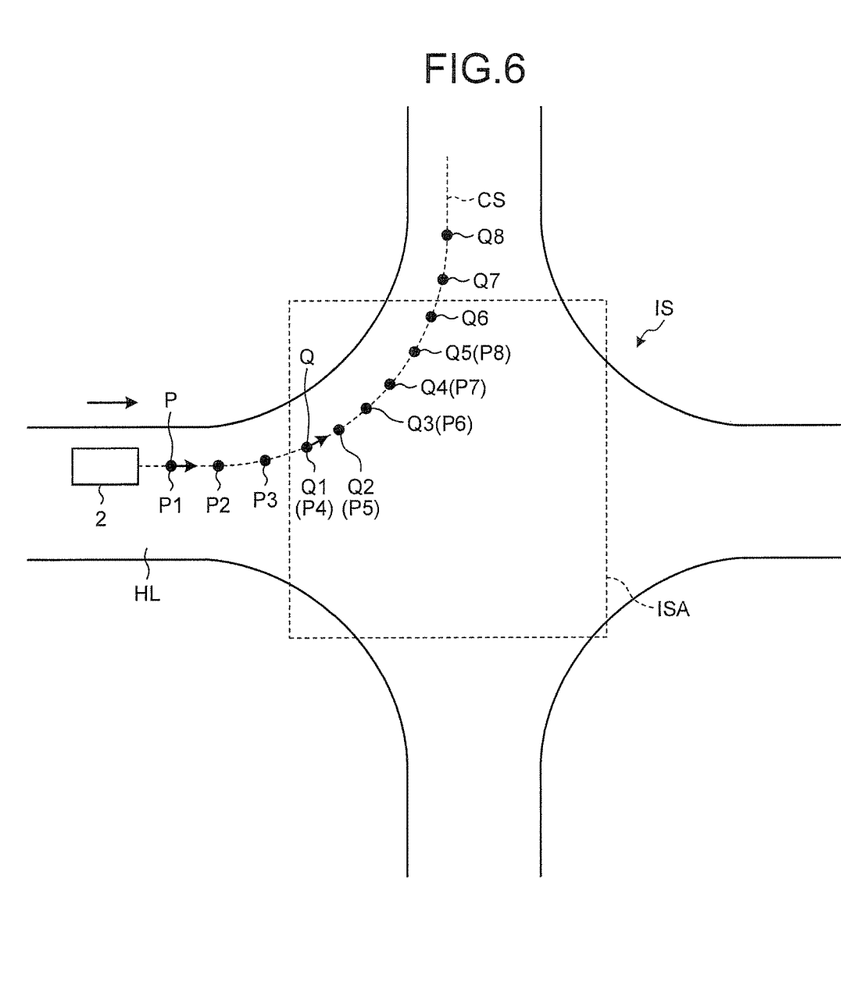
FIG. 6 is a figure for explaining running control and direction indicator control in the dump truck according to the present embodiment.

Subsequently, an example of running control and direction indicator control of the dump truck 2 according to the present embodiment will be explained. FIG. 6 is a schematic view for explaining running control and direction indicator control of the dump truck 2.

In the present embodiment, when the dump truck 2 running the conveyance path HL comes close to the intersection IS and makes a right turn or a left turn at the intersection IS, the direction indicator 37 is illuminated. As illustrated in FIG. 6, the dump truck 6 runs in the mine in accordance with the running condition data including multiple course points which are set with a regular interval W. As described above, multiple course points include course type data indicating whether these course points are defined at the intersection IS or not. In the example as illustrated in FIG. 6, the course points P1, P2, P3, Q7, Q8 are located on the conveyance path HL outside of an intersection area ISA including the intersection IS, and multiple course points between the course point P3 and the course point Q7 are located in the intersection area ISA. Each of the course points P1, P2, P3, Q7, Q8 includes course type data indicating that it is defined not in the intersection IS but in the conveyance path HL. The multiple course points between the course point P3 and the course point Q7 include course type data indicating that they are defined in the intersection area ISA.

In the present embodiment, a determination is made as to whether the dump truck 2 makes a right turn or a left turn at the intersection IS based on the predetermined number of course points arranged continuously with a regular interval W at the forward side in the running direction of the dump truck 2. In the present embodiment, how far this determination is made on the course points may be set as necessary. In order to simplify the explanation, FIG. 6 illustrates an example where eight course points P1, P2, P3, P4, P5, P6, P7, P8 are set continuously with a regular interval W at the forward side in the running direction of the dump truck 2.

The turn determination unit 43 calculates an azimuth difference indicating, at a predetermined point in time (for example, at the present point in time), a difference of target azimuth between a standard course point P and a reference course point Q which is ahead in the running direction by a predetermined distance with respect to the standard course point P. In the present embodiment, the standard course point P and the reference course point Q are three points away, i.e., away by a distance of 3 W, but how far the reference course point is configured to be away from the standard course point may be set as necessary.

The turn determination unit 43 also calculates the azimuth difference for each of multiple standard course points P at any given point in time. In the example illustrated in FIG. 6, at the point in time when the running dump truck 2 is at the position illustrated in FIG. 6, the azimuth difference $\Delta 1$ between the standard course point P1 and the reference course point Q1 is calculated, the azimuth difference $\Delta 2$ between the standard course point P2 and the reference course point Q2 is calculated, the azimuth difference $\Delta 3$ between the standard course point P3 and the reference course point Q3 is calculated, the azimuth difference $\Delta 4$ between the standard course point P4 and the reference course point Q4 is calculated, the azimuth difference $\Delta 5$ between the standard course point P5 and the reference course point Q5 is calculated, the azimuth difference $\Delta 6$ between the standard course point P6 and the reference course point Q6 is calculated, the azimuth difference $\Delta 7$ between the standard course point P7 and the reference course point Q7 is calculated, and the azimuth difference $\Delta 8$ between the standard course point P8 and the reference course point Q8 is calculated. For each combination of multiple standard course points P and multiple reference course points Q corresponding to the multiple standard course points P, the turn determination unit 43 calculates the azimuth difference $\Delta$ at the reference course point. In the present embodiment, how far the standard course points and the reference course points are used to calculate the azimuth difference may be set as necessary.

In this case, based on relationship between the distance between the standard course point P and the reference course point Q and the azimuth difference of the standard course point P and the reference course point Q, the curvature radius of the running condition data thus designated is derived. More specifically, in order to determine whether the curvature radius of the running condition data designated is equal to or less than a predetermined value, a determination may be made as to whether the azimuth difference between the standard course point P and the reference course point Q is equal to or more than a predetermined angle (for example, two degrees) based on the distance (for example, 3 W) between the standard course point P and the reference course point Q determined in advance.

An example of a determination method for determining whether a turn is continuously made for a predetermined distance or more includes increasing a count by one when the dump truck 2 is determined to make a turn with a predetermined curvature radius or less based on the azimuth difference $\Delta$ between the standard course point P and the reference course point Q as described above and making a determination at the point in time when the count value attains a predetermined value. More specifically, for example, the following calculation is performed continuously. A count is incremented from zero to one when the dump truck 2 makes a turn with a predetermined curvature radius or less based on the azimuth difference $\Delta 1$ between the standard course point P1 and the reference course point Q1, and subsequently, the count value is incremented from one to two when the dump truck 2 makes a turn with a predetermined curvature radius or less based on the azimuth difference $\Delta 2$ between the standard course point P2 and the reference course point Q2.

When the course type data of the reference course point Q indicates the intersection IS (existing in the intersection area ISA) and there is a combination of a standard course point P and a reference course point Q where the azimuth difference $\Delta$ is equal to or more than the angle threshold value $\Delta$sh, the turn determination unit 43 increments the counter by one, and when the counter value indicates that the combinations exist continuously for the count threshold value SH or more, the dump truck 2 is determined to make a turn with a predetermined curvature radius or less over a predetermined distance or more in the intersection IS. In this case, the predetermined distance corresponds to a distance obtained by multiplying the interval W of the running condition data by the count threshold value SH. When the turn determination unit 43 makes the above determination, the winkers control unit 44 causes the direction indicator 37 to illuminate. In the present embodiment, the angle threshold value $\Delta$sh and the count threshold value SH may be set to any given value.

The winkers control unit 44 outputs a winker control signal so that, when the dump truck 2 is determined to make a turn with a predetermined curvature radius or less over a predetermined distance or more, the winkers control unit 44 causes the direction indicator 37 to illuminate, and when the dump truck 2 is determined to have run a predetermined distance or more and thereafter the dump truck 2 is determined to run with the predetermined curvature radius or more at the point in time when the right turn or the left turn is almost finished, the winkers control unit 44 turns off the direction indicator 37.

<Management Method>

Figure 7:
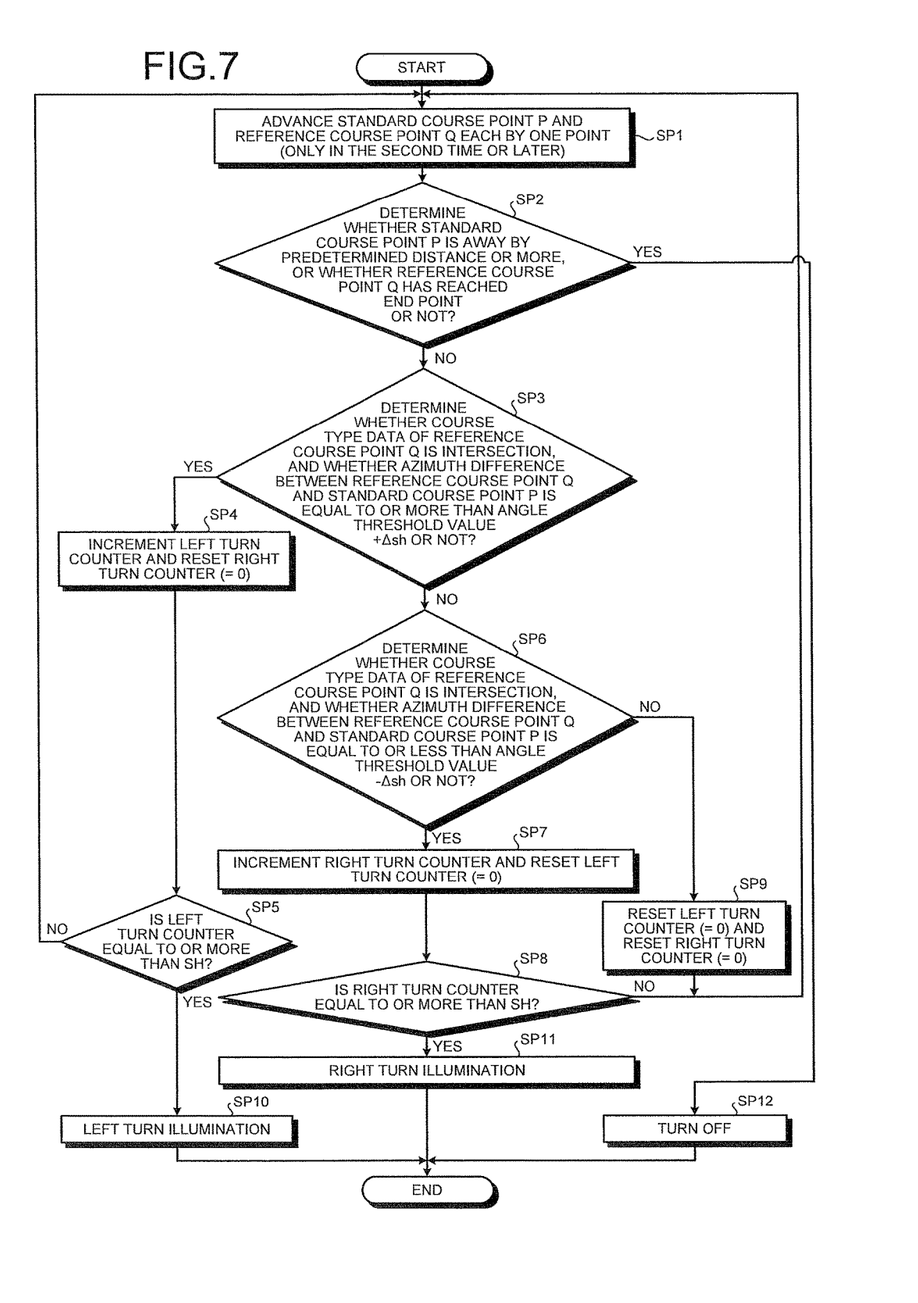
FIG. 7 is a flowchart illustrating an example of operation of a control system in the dump truck according to the present embodiment.

Subsequently, the management method of the dump truck 2 according to the present embodiment will be explained. FIG. 7 is a flowchart illustrating an example of operation of the management system 1 according to the present embodiment.

At the present point in time, the standard course point P and the reference course point Q are set (step SP1). The turn determination unit 43 determines whether the standard course point P is away from the dump truck 2 by the predetermined distance or more, or whether the reference course point Q has reached the end point or not (step SP2). In step SP2, how far from the dump truck 2 this flow is to be continued on the standard course point P may be set as necessary, and when the standard course point P has reached a position farther than the predetermined distance (step SP2: Yes), the direction indicator 37 is turned off without being illuminated (step SP12). The end point of the reference course point Q in step SP2 means an end point of course data that has already been obtained from the processing apparatus 12 of the management apparatus 10 by the control apparatus 25 via the wireless communication apparatus 36, and when the standard course point P and the reference course point Q are advanced by one in step SP1, and the reference course point Q reaches the end point of the course data that is already obtained in step SP2 (step SP2: Yes), the direction indicator 37 is turned off without being illuminated (step SP12).

In a case where, in step SP2, the standard course point P is determined not to be farther by the predetermined distance that is set in advance from the dump truck 2, and the reference course point Q is determined not to be the end point (step SP2: No), the turn determination unit 43 determines whether the course type data of the reference course point Q is the intersection IS, and whether the azimuth difference between the reference course point Q and the standard course point P is equal to or more than the angle threshold value +Δsh or not (step SP3).

In a case where, in step SP3, the course type data of the reference course point Q is determined to be the intersection IS, and the azimuth difference between the reference course point Q and the standard course point P is determined to be equal to or more than the angle threshold value +Δsh (step SP3: Yes), the turn determination unit 43 adds one to (increments) the left turn counter, and resets the right turn counter to zero (step SP4).

The turn determination unit 43 determines whether the left turn counter is equal to or more than the count threshold value SH (step SP5).

In a case where, in step SP5, the left turn counter is determined not to be equal to or more than the count threshold value SH (step SP5: No), the turn determination unit 43 returns back to step SP1, and advances the standard course point P and the reference course point Q by one and carries out the above processing.

In a case where, in step SP5, the left turn counter is determined to be equal to or more than the count threshold value SH (step SP5: Yes), the turn determination unit 43 determines that the dump truck 2 makes a left turn at the intersection IS. The winkers control unit 44 causes the winker lamp 37L to illuminate a left turn illumination (step SP10).

In a case where, in step SP3, the course type data of the reference course point Q is determined not to be the intersection IS, or the azimuth difference between the reference course point Q and the standard course point P is determined not to be equal to or more than the angle threshold value +Δsh (step SP3: No), the turn determination unit 43 determines whether the course type data of the reference course point Q is the intersection IS, and whether the azimuth difference between the reference course point Q and the standard course point P is equal to or less than the angle threshold value −Δsh (step SP6).

In a case where, in step SP6, the course type data of the reference course point Q is determined to be the intersection IS, and the azimuth difference between the reference course point Q and the standard course point P is determined to be equal to or less than the angle threshold value −Δsh (step SP6: Yes), the turn determination unit 43 adds one to (increments) the right turn counter, and resets the left turn counter to zero (step SP7).

The turn determination unit 43 determines whether the right turn counter is equal to or more than the count threshold value SH (step SP8).

In a case where, in step SP8, the right turn counter is determined not to be equal to or more than the count threshold value SH (step SP8: No), the turn determination unit 43 returns back to step SP1, and advances the standard course point P and the reference course point Q by one and carries out the above processing.

In a case where, in step SP8, the right turn counter is determined to be equal to or more than the count threshold value SH (step SP8: Yes), the turn determination unit 43 determines that the dump truck 2 makes a right turn at the intersection IS. The winkers control unit 44 causes the winker lamp 37R to illuminate a right turn illumination (step SP11).

In a case where, in step SP6, the course type data of the reference course point Q is determined not to be the intersection IS, or the azimuth difference between the reference course point Q and the standard course point P is determined not to be equal to or less than the angle threshold value −Δsh (step SP6: No), the turn determination unit 43 resets the right turn counter to zero, and resets the left turn counter to zero (step SP9). Thereafter, the turn determination unit 43 returns back to step SP1.

The above flow is carried out with a predetermined interval while the dump truck 2 is running. Therefore, in a case where the above flow is carried out at the point in time when a right turn or a left turn is almost finished after the dump truck 2 has run a predetermined distance while the dump truck 2 was determined to make a right turn or a left turn and the direction indicator 37 is illuminating, the curvature radius of the target running path RP becomes large (the curve becomes gentle) before the value of the right turn counter or the left turn counter attains the count threshold value SH or more although the dump truck 2 is making the right turn or the left turn, and when the azimuth difference between the standard course point P and the reference course point Q is no longer more than the angle threshold value, the right turn counter or the left turn counter is reset, and ultimately, in step SP2, the direction indicator 37 is turned off.

<Actions and Effects>

As explained above, according to the present embodiment, in a case where the dump truck 2 runs in the mine based on the designated running condition data, a determination is made as to whether the dump truck 2 makes a turn with the predetermined curvature radius or less over the predetermined distance or more based on the running condition data, and in a case where the dump truck 2 is determined to make a turn with the predetermined curvature radius or less over the predetermined distance or more, the direction indicator 37 provided on the dump truck 2 is caused to illuminate. Accordingly, a driver of a manned vehicle around the dump truck 2 or a worker working in the mine can find the running direction of the dump truck 2. Therefore, the safety of the mine is improved.

The winkers control unit 44 outputs the winker control signal so that, when the dump truck 2 is determined to make a turn with the predetermined curvature radius or less over the predetermined distance or more, the direction indicator 37 is caused to illuminate, and when the dump truck 2 is determined to be running with the predetermined curvature radius or more at the point in time when a right turn or a left turn is almost finished after the dump truck 2 has run over the predetermined distance or more, the direction indicator 37 is turned off. Therefore, the direction indicator 37 is prevented from illuminating indefinitely after the dump truck 2 passes the intersection IS and starts driving the running path HL.

In the present embodiment, the running condition data is an aggregate of multiple course points PI each including absolute position data and set with a regular interval W. Each of multiple course points PI includes the target azimuth data of the dump truck 2 and course type data indicating whether the course point PI is defined at the intersection IS of the mine or not. Therefore, the turn control unit 43 can determine whether the dump truck 2 makes a turn at the intersection IS or not based on the running condition data. Accordingly, even if the dump truck 2 is making a turn with the predetermined curvature radius or less over the predetermined distance or more which is not the intersection IS and is a part of the running path HL, the direction indicator 37 is prevented from illuminating when the dump truck 2 is running along the curve.

In the present embodiment, each of the predetermined number of course points PI arranged continuously with the regular interval W is set as the standard course point P, and the turn determination unit 43 calculates the azimuth difference $\Delta$ indicating the difference of target azimuth between the standard course point P and the reference course point Q at the forward side in the running direction by a certain distance with respect to the standard course point P, and calculates the azimuth difference $\Delta$ ($\Delta 1$, $\Delta 2$, ... ) for each of the combinations of multiple standard course points P (P1, P2, ... ) and multiple reference course points Q (Q1, Q2, ... ) corresponding to these standard course points P, and when it is determined that the combinations of the standard course points P and the reference course points Q of which absolute value of the azimuth difference $\Delta$ is equal to or more than the angle threshold value $\Delta$sh (equal to or more than $+\Delta$sh or equal to or less than $-\Delta$sh) exist continuously for the count threshold value SH or more, the dump truck 2 is determined to make a turn at the intersection IS with the predetermined curvature radius or less over the predetermined distance or more. Therefore, by using multiple course points PI (P, Q) including the target azimuth data and course type data, a determination as to whether the dump truck 2 is making a right turn or not or making a left turn or not can be determined accurately.

<Modification>

Figure 8:
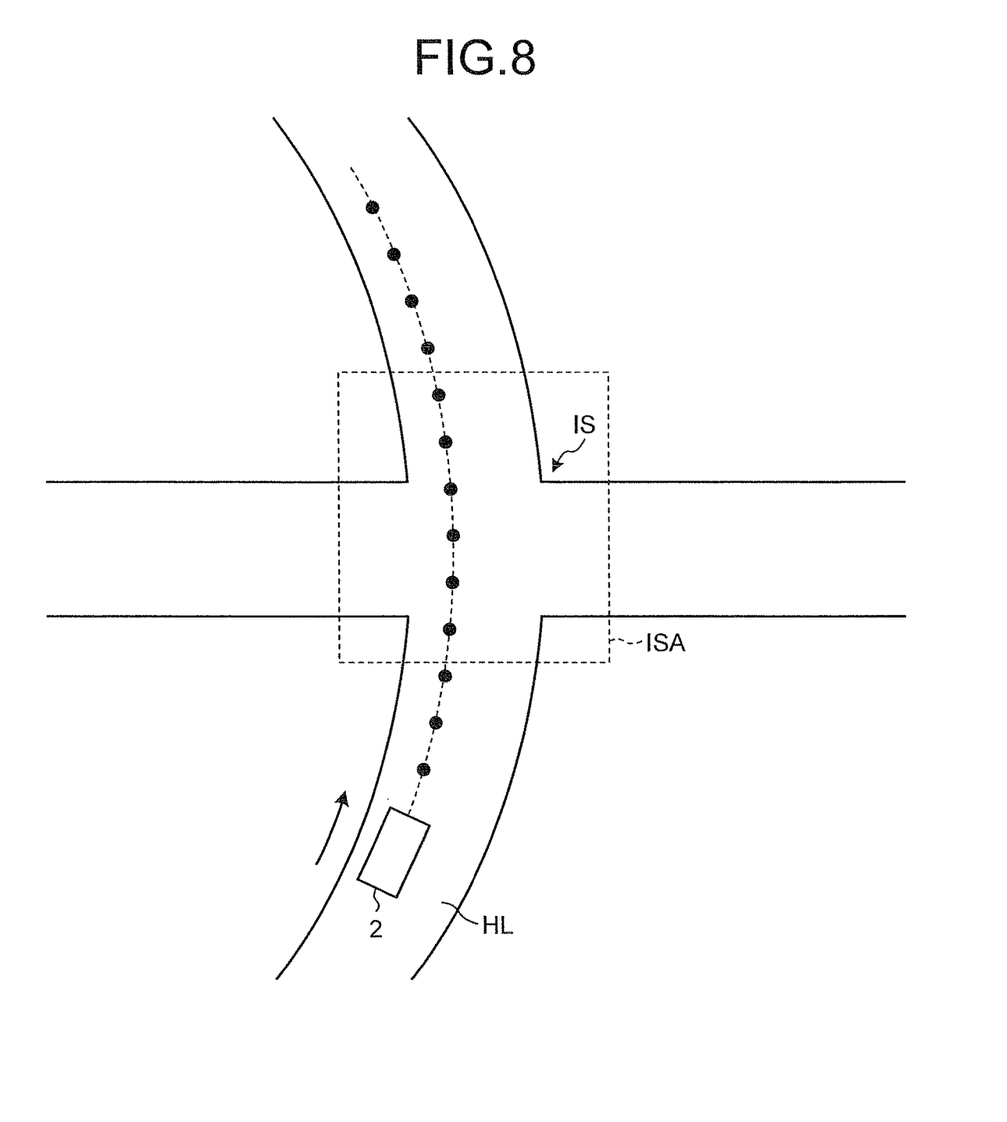
FIG. 8 is a figure for explaining running control and direction indicator control in the dump truck according to the present embodiment.

In the above embodiment, in a case where the turn determination unit 43 determines any one of the left turn illumination, the right turn illumination, and the OFF state, this determination may be a determination inappropriately for the shape of the intersection when the dump truck 2 passes the intersection. For example, as illustrated in FIG. 8, the dump truck 2 may go straight without making any right or left turn when the dump truck 2 passes the intersection IS. However, in the running path HL as illustrated in FIG. 8, a part of the running path HL is curved with the predetermined curvature radius or less over the predetermined distance or more. In the example illustrated in FIG. 8, even when the dump truck 2 goes straight without making a right turn or a left turn at the intersection IS, the turn determination unit 43 determines that the dump truck 2 makes a turn at the intersection IS with the predetermined curvature radius or less over the predetermined distance or more.

Even in such case, the winkers control unit 44 may be configured to correct the determination result of the turn determination unit 43 based on determination correction data defined in advance based on an area of the mine (data for correcting determination of the winkers control in a case where the dump truck 2 runs along any specific running path). Therefore, in the case as illustrated in FIG. 8, the correction can be applied so that, even when the dump truck 2 is determined to make a turn at the intersection IS with a predetermined curvature radius or less over a predetermined distance or more, the direction indicator 37 does not illuminate.

In addition to the example as illustrated in FIG. 8, even in a case where the turn determination unit 43 makes a determination other than that in the running path where a right turn illumination or a left turn illumination is to be illuminated, the winkers control unit 44 can cause desired winkers to illuminate by setting the determination correction data. The running path where the turn determination unit 43 makes an inappropriate determination as illustrated in FIG. 8 is limited, and such running path can be identified through, for example, test run in the mine by using the dump truck 2.

In the test travelling, the dump truck 2 can identify the absolute position of the above running path from the result of the position detection device 35. The position data of the running path and the turn determination to be corrected in the running path are stored to the storage unit 45. The position data of the running path and the turn determination to be corrected in the running path are an aspect of determination correction data for preventing the direction indicator 37 from illuminating. The winkers control unit 44 can correct the inappropriate determination result made by the turn determination unit 43 at the intersection IS based on the detection result of the position detection device 35 and the determination correction data associated with the position data of the running path stored in the storage unit 45.

It should be noted that the position data of the running path and the turn determination to be corrected in the running path may be stored to the storage unit 45 provided on the dump truck 2, or alternatively, the position data of the running path and the turn determination to be corrected in the running path may be stored to the management apparatus 10, and may be transmitted from the management apparatus 10 to the dump truck 2. The winkers control unit 44 can correct the inappropriate determination result made by the turn determination unit 43 at the intersection IS based on the determination correction data associated with the position data of the running path transmitted from the management apparatus 10.

In the above embodiment, a determination is made based on the interval of multiple pieces of running condition data (for example, 3 W) and the azimuth difference (for example, two degrees) in order to determine whether the dump truck 2 makes a turn with a predetermined curvature radius or less, but the embodiment is not limited thereto. For example, a determination can be made by using a detection result of a steering angle of a steering, not illustrated, or a determination may be made by using a detection result of an azimuth sensor such as a gyro, not illustrated.

In the embodiment explained above, the dump truck 2 is considered to be an unmanned dump truck. The dump truck 2 may be a manned dump truck that runs in accordance with manipulation of the driver. In the manned dump truck, a manipulation unit such as a winkers lever for manipulating the direction indicator 37 may be provided, and the manipulation unit is manipulated by the driver. In a case where the dump truck 2 makes a right turn or a left turn at the intersection IS, even if the driver fails to manipulate the manipulation unit, the control system 20 intervenes into the manipulation of the manipulation unit to cause the direction indicator 37 to illuminate. More specifically, the control system 20 carries out a so-called assist control for helping the manipulation of the driver. Therefore, the safety in the mine is ensured.

In the embodiment explained above, the turn determination unit 43 in the control apparatus 25 provided in the dump truck 2 makes a determination as to whether the dump truck 2 makes a right turn or a left turn, but the embodiment is not limited to this example. For example, the turn determination unit 43 and the winkers control unit 44 may be provided in the processing apparatus 12 of the management apparatus 10, and in the processing apparatus 12, a determination may be made as to whether the target dump truck 2 makes a right turn or a left turn based on the running condition data, and the determination result thereof may be configured to be transmitted to the target dump truck 2 via the winkers control unit 44.

The embodiment explained above has been explained by using the mine machine used in the mine as an example, but the embodiment is not limited thereto. The embodiment may also be applied to a work machine used at a work site. The work machine includes the mine machine. In the embodiment explained above, "the control system for the work machine" has been explained by using the control system for the dump truck in the mine on the ground as an example, but the embodiment is not limited thereto. "The control system for the work machine" also includes control systems for other mine machines in the mine on the ground or work machines used at work sites (e.g., wheel loaders).

REFERENCE SIGNS LIST

1 MANAGEMENT SYSTEM
2 DUMP TRUCK (WORK MACHINE)
3 ANOTHER MINE MACHINE
4 MINE MACHINE
5 MEASUREMENT SATELLITE
6 RELAY DEVICE
7 CONTROL FACILITIES
9 COMMUNICATION SYSTEM
10 MANAGEMENT APPARATUS
11 COMPUTER
12 PROCESSING APPARATUS
13 STORAGE APPARATUS
13B DATABASE
15 INPUT AND OUTPUT UNIT
16 DISPLAY APPARATUS
17 INPUT APPARATUS
18 WIRELESS COMMUNICATION APPARATUS
18A ANTENNA
19 GPS BASE STATION
19A ANTENNA
19B TRANSMISSION AND RECEPTION APPARATUS
20 CONTROL SYSTEM
21 CRUISING APPARATUS
22 VEHICLE MAIN BODY
23 VESSEL
24 DRIVING APPARATUS
25 CONTROL APPARATUS
26 WHEEL
27 AXLE
28 BRAKE APPARATUS
29 STEERING APPARATUS
31 RUNNING SPEED DETECTION DEVICE
32 ACCELERATION DETECTION DEVICE
35 POSITION DETECTION DEVICE
35A ANTENNA
36 WIRELESS COMMUNICATION APPARATUS
36A ANTENNA
37 DIRECTION INDICATOR
41 INPUT AND OUTPUT UNIT
42 DRIVING CONTROL UNIT
43 TURN DETERMINATION UNIT
44 WINKERS CONTROL UNIT
45 STORAGE UNIT
CR CRUSHING MACHINE
DPA EARTH DUMPING SITE
HL CONVEYANCE PATH
IS INTERSECTION
ISA INTERSECTION AREA
LPA LOADING SITE
PA WORK SITE
RP TARGET RUNNING PATH

The invention claimed is:

1. A control system for a work machine that is an unmanned work machine operated in a mine, comprising:
a turn determination unit configured to determine whether the work machine makes a turn with a predetermined curvature radius of a running path or less, based on running condition data including at least position data and target azimuth data for performing running control of the work machine; and
a winkers control unit configured to output a winker control signal based on a determination result of the turn determination unit, wherein
the winkers control unit outputs the winker control signal for illuminating a direction indicator on the work machine when the work machine is determined to make a turn with the predetermined curvature radius or less.

2. The control system for the work machine according to claim 1, wherein
the turn determination unit determines whether the work machine makes a turn with the predetermined curvature radius or less over a predetermined distance or more based on the running condition data,
the winkers control unit outputs the winker control signal for illuminating when the work machine is determined to make a turn with the predetermined curvature radius or less over the predetermined distance or more, and
the winkers control unit outputs the winker control signal for turning off when the work machine is determined to run for the predetermined distance or more and thereafter the work machine is determined to run with the predetermined curvature radius or more.

3. The control system for the work machine according to claim 1, wherein the running condition data includes an aggregate of a plurality of course points which are set at predetermined intervals,
a target running path of the work machine is defined by a track that passes the plurality of course points,
each of the plurality of course points includes the target azimuth data of the work machine,
the turn determination unit determines whether the work machine makes a turn with the predetermined curvature radius or less over a predetermined distance or more based on the running condition data, and
the winkers control unit outputs a winker control signal for illuminating when the work machine is determined to make a turn with the predetermined curvature radius or less over the predetermined distance or more based on the target azimuth data of the work machine.

4. The control system for the work machine according to claim 3, wherein the running condition data includes course type data indicating whether the course point is defined at an intersection of a mine or not, and the winkers control unit outputs a winker control signal for illuminating when the work machine is determined to make a turn at the intersection based on the course type data.

5. The control system for the work machine according to claim 1, wherein the winkers control unit corrects, based on determination correction data defined in advance based on an area of the mine, illuminate or non-illuminate determination of a direction indicator made by the turn determination unit.

6. A work machine comprising:
the control system for the work machine according to claim 1; and
a cruising apparatus capable of running in a mine.

7. A management system for a work machine comprising:
a work machine according to claim 6; and
a management apparatus configured to wirelessly communicate the running condition data to the work machine,
wherein the work machine runs based on the running condition data from the management apparatus.

8. The control system for the work machine according to claim 1, wherein the running condition data includes an aggregate of a plurality of course points which are set at predetermined intervals,
a target running path of the work machine is defined by a track that passes the plurality of course points,
each of the plurality of course points includes the target azimuth data of the work machine,
each of a predetermined number of course points which are arranged continuously at predetermined intervals at a forward side in a running direction of the work machine is set as a standard course point,
the turn determination unit calculates an azimuth difference indicating a difference in target azimuth between the standard course point and a reference course point at the forward side in the running direction by a predetermined distance with respect to the standard course point, calculates the azimuth difference for each of the plurality of standard course points, and determines that the work machine is making a turn when it is determined that standard course points each of whose azimuth differences is equal to or more than an angle threshold value exist continuously for a count threshold value or more.

9. The control system for the work machine according to claim 1, wherein
the turn determination unit determines whether the work machine makes a turn with the predetermined curvature radius or less over a predetermined distance or more based on the running condition data, and
the winkers control unit outputs the winker control signal for illuminating when the work machine is determined to make a turn with the predetermined curvature radius or less over the predetermined distance or more.

10. The control system for the work machine according to claim 1, wherein
the turn determination unit determines whether the work machine makes a turn with the predetermined curvature radius or less over a predetermined distance or more based on the running condition data, and
the winkers control unit outputs the winker control signal for turning off when the work machine is determined to run for the predetermined distance or more and thereafter the work machine is determined to run with the predetermined curvature radius or more.

11. A management method for a work machine that is an unmanned work machine operated in a mine, comprising:
determining whether the work machine makes a turn with a predetermined curvature radius of a running path or less, based on running condition data including at least position data and target azimuth data for performing running control of the work machine; and
outputting a winker control signal based on a result of the determination, wherein
outputting the winker control signal for illuminating a direction indicator on the work machine when the work machine is determined to make a turn with the predetermined curvature radius or less.

* * * * *